(12) United States Patent
Barberan Latorre

(10) Patent No.: US 11,325,382 B2
(45) Date of Patent: May 10, 2022

(54) SYSTEM AND METHOD FOR APPLYING ADHESIVE GLUES BY MEANS OF DIGITAL INKJET PRINT HEADS

(71) Applicant: Jesus Francisco Barberan Latorre, Castelldefels (ES)

(72) Inventor: Jesus Francisco Barberan Latorre, Castelldefels (ES)

( * ) Notice: Subject to any disclaimer, the term of this patent is extended or adjusted under 35 U.S.C. 154(b) by 0 days.

(21) Appl. No.: 17/483,221

(22) Filed: Sep. 23, 2021

(65) Prior Publication Data

US 2022/0105728 A1 Apr. 7, 2022

(30) Foreign Application Priority Data

Oct. 2, 2020 (EP) .................................... 20382878

(51) Int. Cl.
*B41J 2/16* (2006.01)
*B05D 5/10* (2006.01)
*B41J 2/12* (2006.01)

(52) U.S. Cl.
CPC ............... *B41J 2/1623* (2013.01); *B41J 2/12* (2013.01)

(58) Field of Classification Search
CPC ....... B41J 2/1623; B41J 2/14129; B65C 5/02; B05D 5/10
See application file for complete search history.

(56) References Cited

U.S. PATENT DOCUMENTS

| 5,916,393 A * | 6/1999 | Shaffer .................... B05D 5/10 156/82 |
| 2015/0044384 A1* | 2/2015 | Kai .................... H01L 27/14685 427/430.1 |
| 2017/0239685 A1 | 8/2017 | Kawabe |
| 2018/0186494 A1* | 7/2018 | Kronseder ............. B05C 13/02 |

FOREIGN PATENT DOCUMENTS

| WO | 2016150681 A1 | 9/2016 |
| WO | 2020108826 A1 | 6/2020 |

OTHER PUBLICATIONS

European Search Report for Corresponding European Application No. 20382878.5, 5 pages, dated Apr. 12, 2021.

* cited by examiner

*Primary Examiner* — Jason S Uhlenhake
(74) *Attorney, Agent, or Firm* — Lucas & Mercanti, LLP

(57) ABSTRACT

A system and method for applying adhesive glues is provided using digital inkjet print heads for bonding at least one first element and one second element, wherein the system has a processing unit functionally connected to the digital inkjet print head which has a data set about the physical features of at least one of the elements to be bonded which are different in different areas, the processing unit being adapted for selecting the amount of adhesive glue per unit area and/or the type of adhesive glue to be deposited according to the data about the physical features such that the amount per unit area or the type of adhesive glue deposited on the surface is different on the surface of the at least one of the elements to be bonded.

6 Claims, 4 Drawing Sheets

SYSTEM AND METHOD FOR APPLYING ADHESIVE GLUES BY MEANS OF DIGITAL INKJET PRINT HEADS

CROSS REFERENCE TO RELATED APPLICATION

This application claims the benefit of priority from European Patent Application No. 20382878.5 filed on Oct. 2, 2020, which is incorporated herein by reference.

TECHNICAL FIELD

The object of the present invention is a system and a method for applying adhesive glues by means of digital inkjet heads for bonding at least two elements together, such as, for example, a panel or profile and a foil or sheet.

STATE OF THE ART

Adhesive glues or adhesives have the function of bonding and attaching two substrates, for example, a base material to a coating material or to other layers.

The glues, when they are carrying out their adhesion purpose, are solid, while, for applying, transporting, spreading them, and so on, on the surfaces to be bonded and even when they have been applied to the element(s) to be bonded, they need to have a certain mobility to ensure penetration into the surfaces of said elements.

Depending on the way they turn into a liquid, there are different types of adhesive glues:
  Cold glues, to which a solvent or diluent has been added for turning into a liquid.
  Hot or hot-melt glues, which melt with the heat and turn into a liquid.

Regarding the physical bonding process, adhesion can be defined as the force capable of holding together the molecules of materials of different nature. While cohesion is used to designate the force of attraction between the molecules of the same material. In an application for bonding two elements, wherein a suitable glue that causes good adhesion has been selected, the maximum strength of said bond is obtained, as a general rule, with a thickness of the adhesive layer that is suitable to fill the existing recesses on the surfaces of the elements to be bonded due to the roughness and pores thereof.

Any thickness of the glue layer that exceeds said minimum thickness generates a bonding of lower resistance. This is due to the internal cohesion of the glue. Normally, if the glue that is used with the materials to be bonded has good adhesion, this bonding force is always greater than the internal cohesion force of the glue itself. Therefore, the amount of glue adjusted to the roughness of the surfaces is the one that achieves the strongest bonding.

Currently, the most widespread methods for applying adhesive glues are:
  By means of roller, consisting of applying the glue by means of an applicator roller on which the glue is dosed with a dosing roller.
  By means of applicator lips, consisting of dosing the glue through a slot and by varying the speed of glue passing therethrough, the amount of glue applied is varied.
  Also, although to a lesser extent, certain types of glue are applied by means of spray guns, with swirl nozzles or with different spraying systems.

The methods of application by means of roller or by means of lip are contact methods, so they have the disadvantage that, if the product where it is applied is contaminated, then these also become contaminated, spoiled, worn out (for example, by abrasion), etc.

There is also the drawback that, being contact methods, if the surface to be applied is not perfectly calibrated or has irregularities or is convoluted, the application becomes difficult or even impossible.

Furthermore, there are also materials to be bonded that are not able to be glued by contact, since due to its own composition, portions can come off.

Generally, all traditional application methods have the common feature that the grammage, or amount of product that can be applied per unit area, is uniform, within certain tolerances.

OBJECT OF THE INVENTION

The system and method object of the invention consists of using print heads for digital inkjet technology, applying adhesive glues wherein, until now, said glues were applied by means of the traditional methods previously described.

The system for applying adhesive glues by means of digital inkjet print heads object of the invention is applicable to the bonding of at least one first element and one second element. The system comprises at least one digital inkjet print head. It further comprises a processing unit functionally connected to the digital inkjet print head. The processing unit in turn comprises a data set about the physical features of at least one of the elements to be bonded, wherein said physical features are different in different areas of the at least one element to be bonded. The processing unit is configured for:
  selecting the amount of adhesive glue per unit area and/or the type of adhesive glue to be deposited on the surface of the at least one of the elements to be bonded according to the data about the physical features thereof. Thereby, the amount per unit area or the type of adhesive glue deposited on the surface of the at least one element to be bonded is different in different areas of the surface of the element to be bonded, and
  controlling the digital inkjet print head to release said amount of adhesive glue per unit area and/or the type of adhesive glue on the surface of the at least one of the elements to be bonded.

According to the above, the invention is characterised in that the printing is carried out in such a way that the grammage, or amount of adhesive ink deposited per unit area, or the type of adhesive glue is different in different areas of the application surface of the elements to be bonded. The invention therefore makes it possible to select in a controlled way the difference in grammage or the type of adhesive according to the physical features of the elements to be bonded.

According to the foregoing, the invention enables glue to be applied to certain areas of the surface. Thereby, it is possible to apply different amounts of glue on the surface as required in each area, or even correctly applying the glue on convoluted surfaces, curves, vertical or inclined areas, for example, edges, etc.

The invention, therefore, enables glue to be deposited according to the physical features of the elements to be bonded, such as:
  Surface texture, for example, existence of wood grain, cracks, or surface defects.

Materials of the elements to be bonded, which can influence the surface roughness/porousness and therefore the wettability and adherence of the glue or the curing thereof.

Shape of the elements to be bonded or inclination of the surfaces on which the glue is applied, for example, application to the lateral surface or edges and front surface of the panel.

According to the above, the data about the physical features of the elements to be bonded comprise at least one of the following data: roughness of the surface thereof, morphology of the surface thereof and/or type of material of the element.

The ink injection heads, or inkjet heads, enable the products to be injected according to the physical and chemical properties of said adhesive glues. Some of the most representative properties would be:

Viscosity.
Particle size.
Surface tension.
Conductivity.

The application of glue by means of inkjet is very advantageous because it enables dosages to be carried out in very low ranges, also in a very accurate manner, while traditional systems have certain limitations for achieving said low dosages. Thus, in addition to saving by means of less unnecessary consumption of glue, better gluing is achieved, as discussed above.

Another object of the present invention is the method for applying adhesive glues by means of digital inkjet print heads, for bonding at least one first element and one second element. As mentioned above, the system comprises at least one digital inkjet print head. The method comprises the following steps:

receiving the data about the physical features of at least one of the elements to be bonded by a processing unit functionally connected to the digital inkjet print head, wherein said physical features are different in different areas of the at least one element to be bonded, selecting in the processing unit the amount of adhesive glue per unit area and/or the type of adhesive glue to be deposited on the surface of the at least one of the elements to be bonded according to the data about the physical features thereof, so that the amount per unit area or the type of adhesive glue deposited on the surface of the at least one element to be bonded is different in different areas of the surface of the element to be bonded, and dispensing said amount of adhesive glue per unit area and/or the type of adhesive glue received from the processing unit by means of at least one digital inkjet print head on the surface of the at least one of the elements to be bonded.

The invention provides the adhesive glues by means of said injection heads, offering, among others, the following advantages:

Having a precise grammage, to the order of picolitres, according to the resolution of the application head.

Adjusting the grammage according to area and needs, even at the microscopic level.

Adjusting the gluing to the strictly necessary areas of the elements to be bonded.

Applying different types of adhesives, according to the area and depending on the different needs.

As there is no contact, the application system admits a certain irregularity on the surfaces to be applied.

It enables application thereof on surfaces wherein, if there were contact, it would be difficult or impossible, such as, for example, curved, vertical, inclined, irregular surfaces, etc. or surfaces where, if there were contact, particles would detach therefrom.

In the sector of the manufacture of sanitary elements, such as diapers, sanitary towels, band aids, plasters etc., it prevents contamination by contact with the application heads.

The application system enables highly hermetic feed circuits to be created, which enables glues to be applied such as those made up of cyanoacrylates, despite the high reactivity thereof.

In an exemplary embodiment, the processing unit comprises a digital pattern of at least one of the elements to be bonded, wherein each area of the digital pattern is associated with a grammage or type of adhesive to be applied.

In another exemplary embodiment, the application system comprises a sensor connected to the processing unit for measuring at least one physical feature of one of the elements to be bonded and for sending said measurement to the processing unit.

A field of application of this invention would correspond to the use thereof in panel lamination processes, that is, in foil gluing on a flat surface and in the profile coating process, that is, foil gluing on inclined surfaces with foil shaping. These correspond to surface finishing processes of panels and profiles, usually made of wood or derivatives, aluminium, PVC, etc. by using adhesive glues.

Another application would be the gluing and adhering of different layers of insulating materials, these being able to have other types of elements than those discussed above as materials.

The invention can also be applied for the indexing of different parts, of various materials: plastics, metal, wood, cellulose, etc., to obtain a superior structure formed by those different parts. For example, for the formation of doors, the formation of composite profiles, the manufacture of diapers, sanitary towels, band aids, plasters, etc.

DESCRIPTION OF THE FIGURES

Figures are provided in order to complete the description and with the aim of providing a better understanding of the invention. Said figures form an integral part of the description and illustrate an exemplary embodiment of the invention.

DETAILED DESCRIPTION OF THE INVENTION

Figure 1:
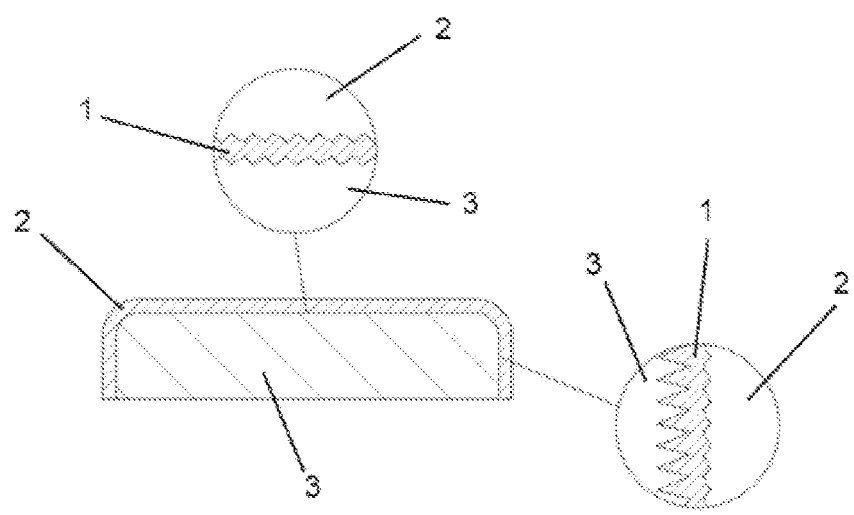
FIG. 1 shows a cross-sectional view of a laminated panel.

FIG. 1 shows a laminated panel which comprises two elements (2, 3), a substrate and a sheet that are bonded by means of adhesive glue (1). In the adhesive glue (1), a cohesion zone is produced in the intermediate area between both elements (2, 3) and an adhesion zone is produced in the vicinity of the adhesive glue (1) with the substrate and with the sheet. The thicker the layer of adhesive glue (1), the lesser the gluing between both elements (2, 3) since the cohesion zone is greater.

In panels or profiles normally used in lamination or coating of materials, such as MDF, HDF, chipboard, etc., substantially larger surfaces (e.g. top or bottom) are much less rough than smaller surfaces (e.g. edges) due to the manufacturing process (fibre orientation etc.). Thus, normally, a greater quantity of glue has to be applied to glue the coating to said smaller surfaces than to the larger ones. FIG. 1 shows a detail of the laminated panel wherein the edge has a greater roughness than the upper surface, the edge requiring a greater amount of adhesive glue (1).

In the method and system object of the invention, a continuous foil fed from a coil can be used, that is, a first element (2) consisting of a continuous foil of material, or discontinuous foils of different materials such as paper, PVC, HPL, CPL, etc. Thereby, any desired appearance can be given to a second element (3), for example, a panel or profile, according to the coating design that is used.

FIGS. 2 to 6 represent different examples of applications of the invention, wherein the adhesive glue (1) can be applied to one or both elements (2, 3) to be bonded by means of digital inkjet print heads (4), which are functionally connected to a processing unit. After the application and the subsequent curing or drying thereof, one of the elements (2) is applied on the other (3) and by applying pressure with a continuous coating or lamination method, gluing is achieved.

Figure 2:
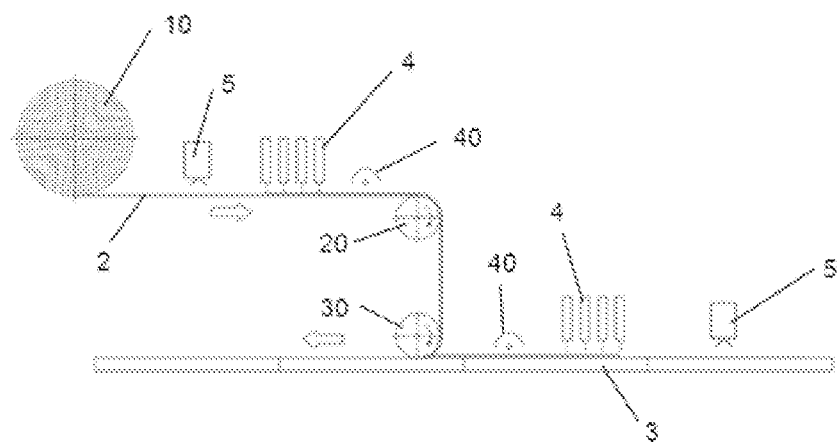
FIG. 2 shows a schematic view of an exemplary embodiment of a lamination or coating with the application of adhesive glue to two elements to be bonded, specifically a foil and a substrate.

In the application example of FIG. 2, the adhesive glue (1) is applied by means of digital inkjet printing to two elements (2, 3) to be bonded, specifically a continuous foil and a substrate. The continuous foil is supplied from a feed coil (10) and is guided by means of a guide roller (20) until the application thereof on the substrate by means of a pressure roller (30). The adhesive glue (1) is cured after the application thereof both on the continuous foil and on the substrate. The adhesive glue (1) is cured, for example, by means of electromagnetic radiation (40), UV, IR, or electron lamps.

Figure 3:
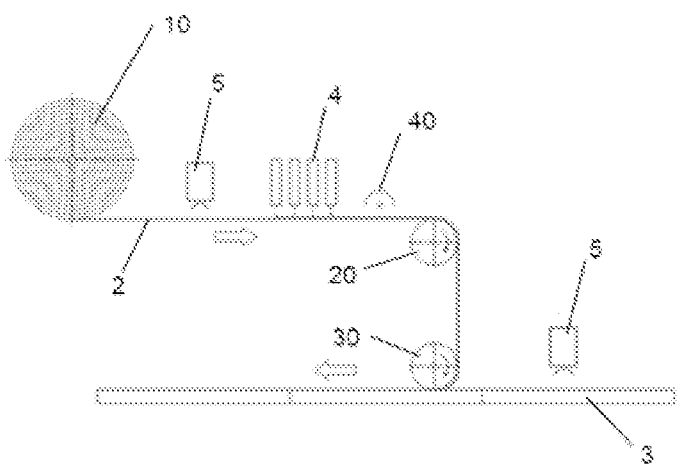
FIG. 3 shows a schematic view of an exemplary embodiment of a lamination or coating with application of adhesive glue to one of the two elements to be bonded, specifically to the foil.

In the application example of FIG. 3, unlike the application example represented in FIG. 2, the adhesive glue (1) is applied by means of digital inkjet printing to only one of the two elements (2, 3) to be bonded, in this case, for example, specifically to the continuous foil.

Figure 4:
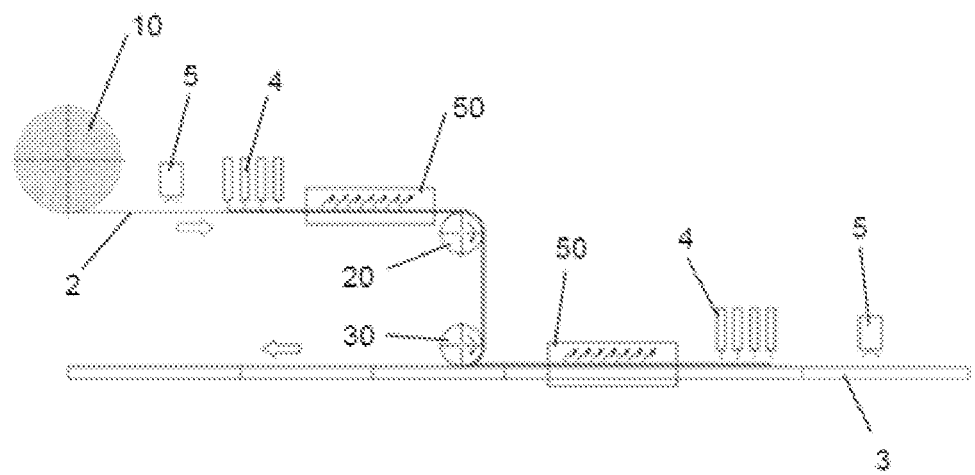
FIG. 4 shows a schematic view of an exemplary embodiment of a lamination or coating with application of water-based or solvent-based glue to the elements to be bonded, specifically a foil and a substrate.

In the application example of FIG. 4, unlike the exemplary embodiments represented in FIG. 2 or 3, the cold adhesive glue (1), water-based or solvent-based, is applied by means of digital inkjet printing to two elements (2, 3) to be bonded, specifically a continuous foil and a substrate. The adhesive glue (1) is fixed by means of drying after the application thereof both on the continuous foil and on the substrate. The adhesive glue (1) is dried by evaporation of the water or solvent, for example, by passing through a heating chamber (50) provided with heating means such as, for example, hot air or heating lamps, for example, by means of IR, etc.

Figure 5:
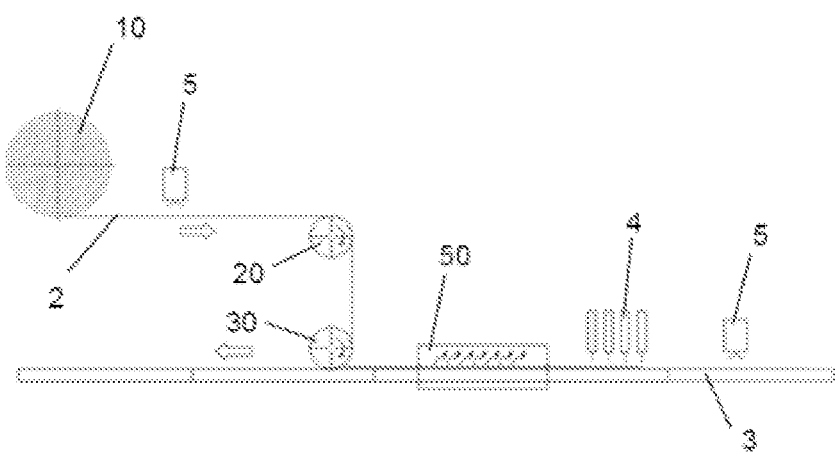
FIG. 5 shows a schematic view of an exemplary embodiment of a lamination or coating with application of water-based or solvent-based glue to one of the elements to be bonded, specifically to the substrate.

In the application example of FIG. 5, unlike the exemplary embodiment shown in FIG. 4, the cold adhesive glue (1), water-based or solvent-based, is applied to one of the elements (2, 3) to be bonded, in this case, for example, specifically to the substrate.

Figure 6:
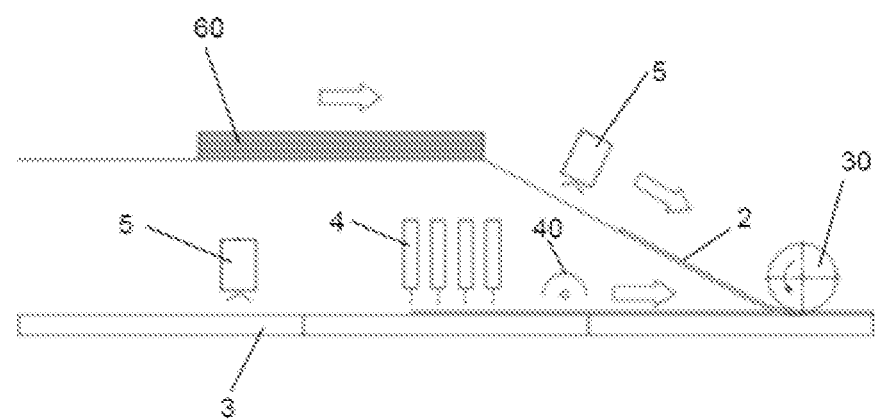
FIG. 6 shows a schematic view of an exemplary embodiment of a sheet-by-sheet indexing application with application of glue to the substrate.

In the application example of FIG. 6, unlike the exemplary embodiments shown in FIGS. 1 to 5, discontinuous foils are used. The foils are fed sheet-by-sheet from a stack of foils (60) until the application thereof to the substrate by means of a pressure roller (30).

In an exemplary embodiment, the processing unit comprises a digital pattern of the surface of at least one of the elements (2, 3) to be bonded. Different areas of the digital pattern are associated with an amount per unit area or a type of adhesive glue (1) to be applied.

The grammage or variable amount of adhesive can be synchronised with a decorative design of the elements (2, 3) to be bonded, that is to say, in correspondence with the decorative design.

For example, the system may comprise a scanner (5) functionally connected to the processing unit and configured for carrying out a scan of the surface of at least one of the elements (2, 3) to be bonded and for sending said scan to the processing unit to make up a digital pattern.

Certain applications in sheets or coating use the so-called embossing foils or 2D foils or texture-touch foils, wherein it is cumbersome and inefficient to apply the adhesive glue (1) with a conventional lip or a roller. The complication of said application lies in the fact that these foils have a texture on the design side, but also on the application side of the adhesive glue (1) there is a counter-texture of the "visible" side, which complicates the application of said adhesive glue (1) because there is no perfect flatness.

Thus, to be able to glue them, what is normally done is to excessively press with the applicator lip or roller in order to apply the glue to the entire surface, filling the recess areas with glue. Therefore, glue consumption is high.

By means of the invention, the foil design is scanned or the digital pattern is provided in a digital file and, by processing the digital scan/file, the digital inkjet print heads (4) inject the necessary amount of adhesive glue (1) for each point.

In another exemplary embodiment, the application of adhesive glue (1) can be dynamically carried out as the application system comprises a sensor that measures the features of the elements (2, 3) to be bonded to select the amount of adhesive to be applied to the different areas in the production line. Said measurement of at least one of the physical features is sent to the processing unit.

The invention claimed is:

1. A system for applying adhesive glues (1) by means of digital inkjet print heads (4), for bonding at least one first element (2) and one second element (3), wherein the system comprises at least one digital inkjet print head (4), the system being characterised in that it comprises a processing unit functionally connected to the digital inkjet print head (4), wherein the processing unit comprises a data set about the physical features of at least one of the elements (2, 3) to be bonded wherein said physical features are different in different areas of the at least one element (2, 3) to be bonded, the processing unit being adapted for:

selecting the amount of adhesive glue (1) per unit area and/or the type of adhesive glue (1) to be deposited on the surface of the at least one of the elements (2, 3) to be bonded according to the data about the physical features thereof (2, 3) such that the amount per unit area or the type of adhesive glue (1) deposited on the surface of the at least one element (2, 3) to be bonded is different in different areas of the surface of the at least one of the elements (2, 3) to be bonded, and controlling the digital inkjet print head (4) to release said amount of adhesive glue (1) per unit area and/or the type of adhesive glue (1) on the surface of the at least one of the elements (2, 3) to be bonded.

2. The system for applying adhesive glues (1) by means of digital inkjet print heads (4), according to claim 1, characterised in that the processing unit comprises a digital pattern of the surface of at least one of the elements (2, 3) to be bonded, wherein different areas of the digital pattern are associated with an amount per unit area or a type of adhesive glue (1) to be applied.

3. The system for applying adhesive glues (1) by means of digital inkjet print heads (4), according to claim 2, characterised in that the system comprises a scanner (5) functionally connected to the processing unit and configured for carrying out a scan of the surface of at least one of the elements (2, 3) to be bonded and for sending said scan to the processing unit to make up the digital pattern.

4. The system for applying adhesive glues (1) by means of digital inkjet print heads (4), according to claim 1, characterised in that the system comprises a sensor functionally connected to the processing unit, the sensor being configured for measuring at least one physical feature of at least one of the elements (2, 3) to be bonded and for sending said measurement to the processing unit.

5. The system for applying adhesive glues (1) by means of digital inkjet print heads (4), according to claim 1, characterised in that the data about the physical features of at least one of the elements (2, 3) to be bonded comprise at least one of the following data:

roughness of the surface thereof, morphology of the surface thereof and/or type of material of the element.

6. A method for applying adhesive glues (1) by means of digital inkjet print heads (4), for bonding at least one first element (2) and one second element (3), wherein the system comprises at least one digital inkjet print head (4), the following steps:

receiving the data about the physical features of at least one of the elements (2, 3) to be bonded by a processing unit functionally connected to the digital inkjet print head (4), wherein said physical features are different in different areas of the at least one element (2, 3) to be bonded, selecting by means of the processing unit the amount of adhesive glue (1) per unit area and/or the type of adhesive glue (1) to be deposited on the surface of the at least one of the elements (2, 3) to be bonded according to the data about the physical features thereof (2, 3) such that the amount per unit area or the type of adhesive glue (1) deposited on the surface of the at least one element (2, 3) to be bonded is different in different areas of the surface of the at least one of the elements (2, 3) to be bonded, and dispensing said amount of adhesive glue (1) per unit area and/or the type of adhesive glue (1) received from the processing unit by means of at least one digital inkjet print head (4) on the surface of the at least one of the elements (2, 3) to be bonded.

* * * * *